(12) United States Patent
Moshgbar

(10) Patent No.: US 6,675,066 B2
(45) Date of Patent: Jan. 6, 2004

(54) CONVEYOR LINE PROCESS CONTROL SYSTEM AND METHOD

(75) Inventor: Mojgan Moshgbar, Mattawan, MI (US)

(73) Assignee: George Koch Sons, LLC, Evansville, IN (US)

(*) Notice: Subject to any disclaimer, the term of this patent is extended or adjusted under 35 U.S.C. 154(b) by 0 days.

(21) Appl. No.: 10/154,698

(22) Filed: May 24, 2002

(65) Prior Publication Data

US 2002/0175041 A1 Nov. 28, 2002

Related U.S. Application Data

(60) Provisional application No. 60/293,923, filed on May 25, 2001.

(51) Int. Cl.[7] .............................. G06F 7/00; B65G 17/20
(52) U.S. Cl. ........................ 700/229; 700/228; 700/230; 198/678.1
(58) Field of Search ................................. 700/229, 230, 700/228, 225; 198/464.1, 678.1

(56) References Cited

U.S. PATENT DOCUMENTS

| | | | |
|---|---|---|---|
| 4,707,250 A | * 11/1987 | Hippenmeyer | ........... 198/349.5 |
| 5,377,814 A | * 1/1995 | Smith et al. | ............. 198/687.1 |
| 6,120,604 A | 9/2000 | Hawkins | |
| 6,181,980 B1 | * 1/2001 | Maeder et al. | .............. 700/229 |
| 6,516,239 B1 | * 2/2003 | Madden et al. | ............. 700/228 |

OTHER PUBLICATIONS

Statement of Dan Langhorst, dated Aug. 26, 2002.
George Koch Sons, LLC Quotation No. 00–129 dated Jul. 26, 2000.
Shielded Cable Legend Drawings, dated Oct. 17, 2000 and Oct. 26, 2000.

* cited by examiner

*Primary Examiner*—Gene O. Crawford
(74) *Attorney, Agent, or Firm*—Bose McKinney & Evans LLP

(57) ABSTRACT

A control system and method for a conveyor line having a conveyor for moving a plurality of hangars configured to carry units through processing areas for processing by equipment in the processing areas includes loading stations for entering process control variables corresponding to units loaded at the loading stations, a pair of conveyor sensors for sensing movement of the hangars and outputting signals indicating the passage of hangars, and a controller. The controller determines, based on the process control variables, the time required for the processing equipment to reach steady state conditions. The controller further determines, based on the signals from the conveyor sensors, the appropriate time for loading units onto hangars such that the unit reaches the processing equipment when the equipment has reached the steady state conditions.

40 Claims, 10 Drawing Sheets

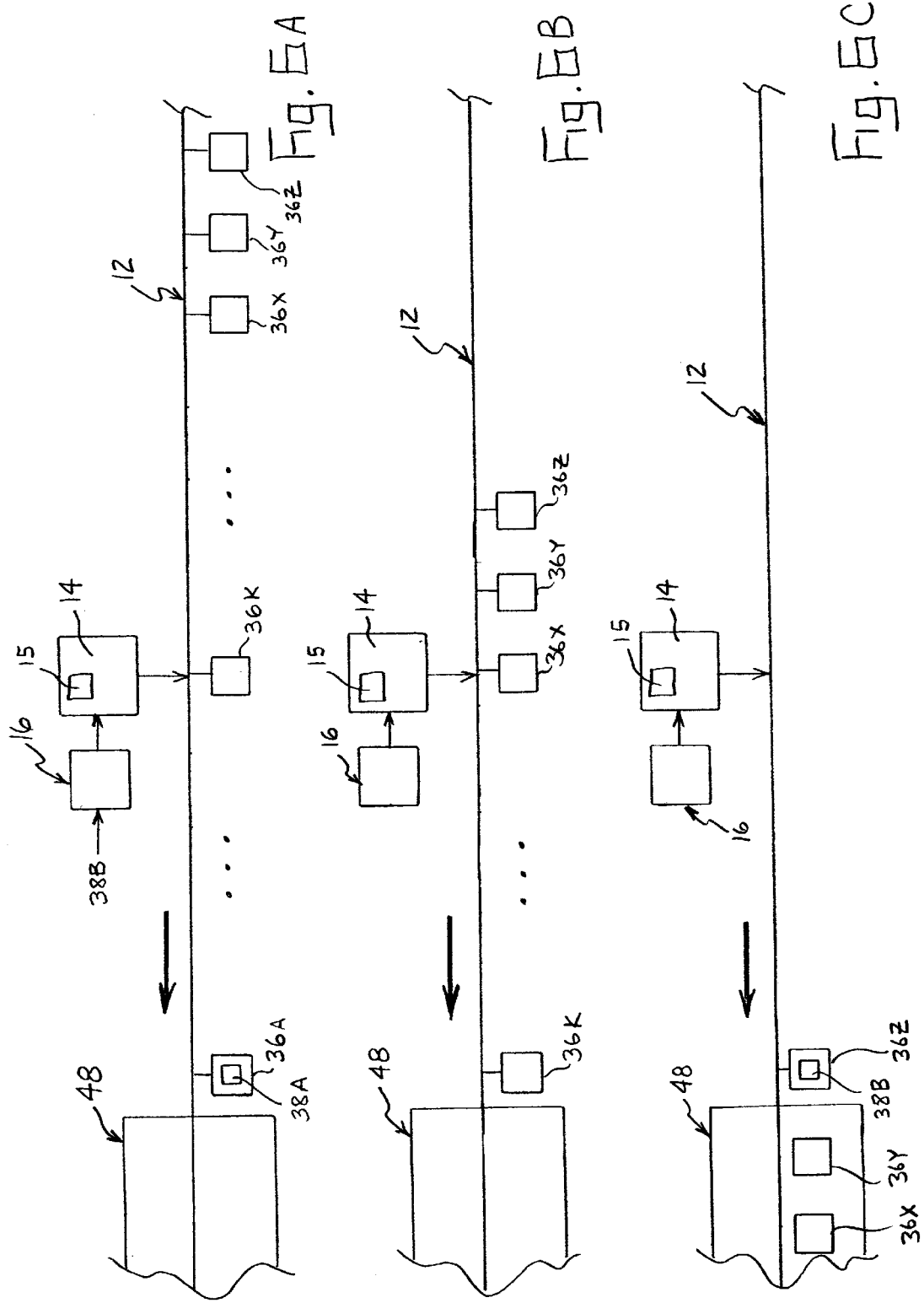

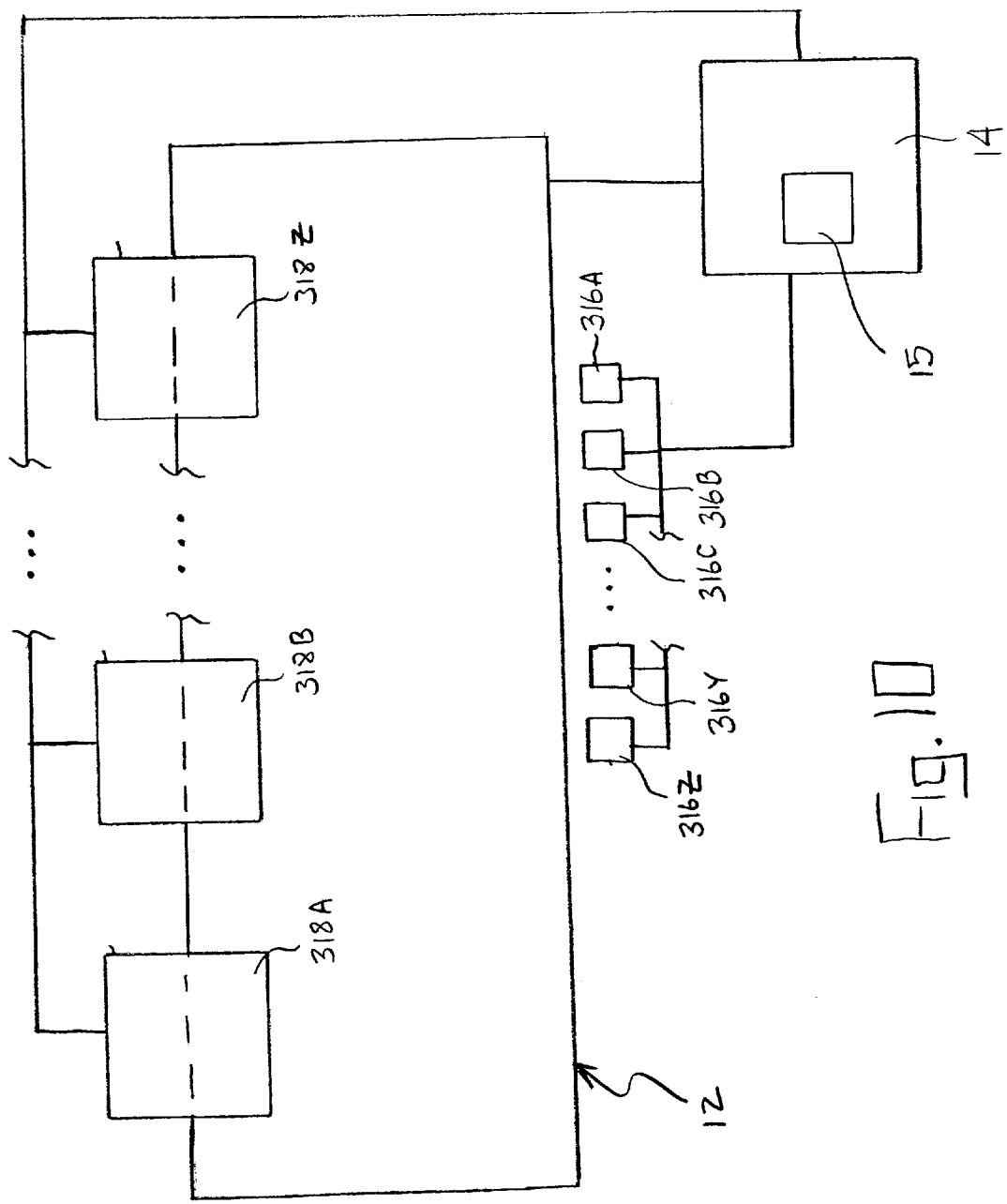

CONVEYOR LINE PROCESS CONTROL SYSTEM AND METHOD

FIELD OF INVENTION

This application claims the benefit of U.S. Provisional Patent Application Serial No. 60/293,923, filed May 25, 2001, which is hereby incorporated herein by reference. The invention relates to conveyor line process control systems and methods, and, more particularly, to multi-station conveyor line process control systems and methods.

BACKGROUND AND SUMMARY OF THE INVENTION

Conveyor systems for moving parts or units through a plurality of processing areas are known. It is desirable to achieve maximum throughput in such systems. It is further desirable to process various types of units using the same conveyor system, without an unacceptable reduction in efficiency.

According to the disclosure, a conveyor line process control system is provided that includes a plurality of loading stations having data entry devices and load indicators. Units are loaded onto the conveyor at each station. A pair of sensors produce signals that indicate whether the conveyor is moving forward, backward, or has stopped. The plurality of data entry devices and the sensors are connected to a controller. In one embodiment, operators at each loading station select a unit type on a data entry device corresponding to the units to be loaded at the station. The controller maps the conveyor system into memory, and selects the process control variables corresponding to each loaded unit. The process control variables control processing equipment located in a plurality of processing areas through which the conveyor and the units to be processed travel during use.

The features and advantages of the present invention described above, as well as additional features and advantages, will be readily apparent to those skilled in the art upon reference to the following description and the accompanying drawings.

BRIEF DESCRIPTION OF THE DRAWINGS

FIGS. 6A–C are conceptual diagrams illustrating a sequence of events associated with processing units having different processing requirements.

FIG. 10 is a block diagram of an another embodiment of a conveyor line control system configured to associate process variable data with units on a conveyor loaded from a plurality of stations.

DETAILED DESCRIPTION OF EMBODIMENTS OF THE INVENTION

Figure 1:
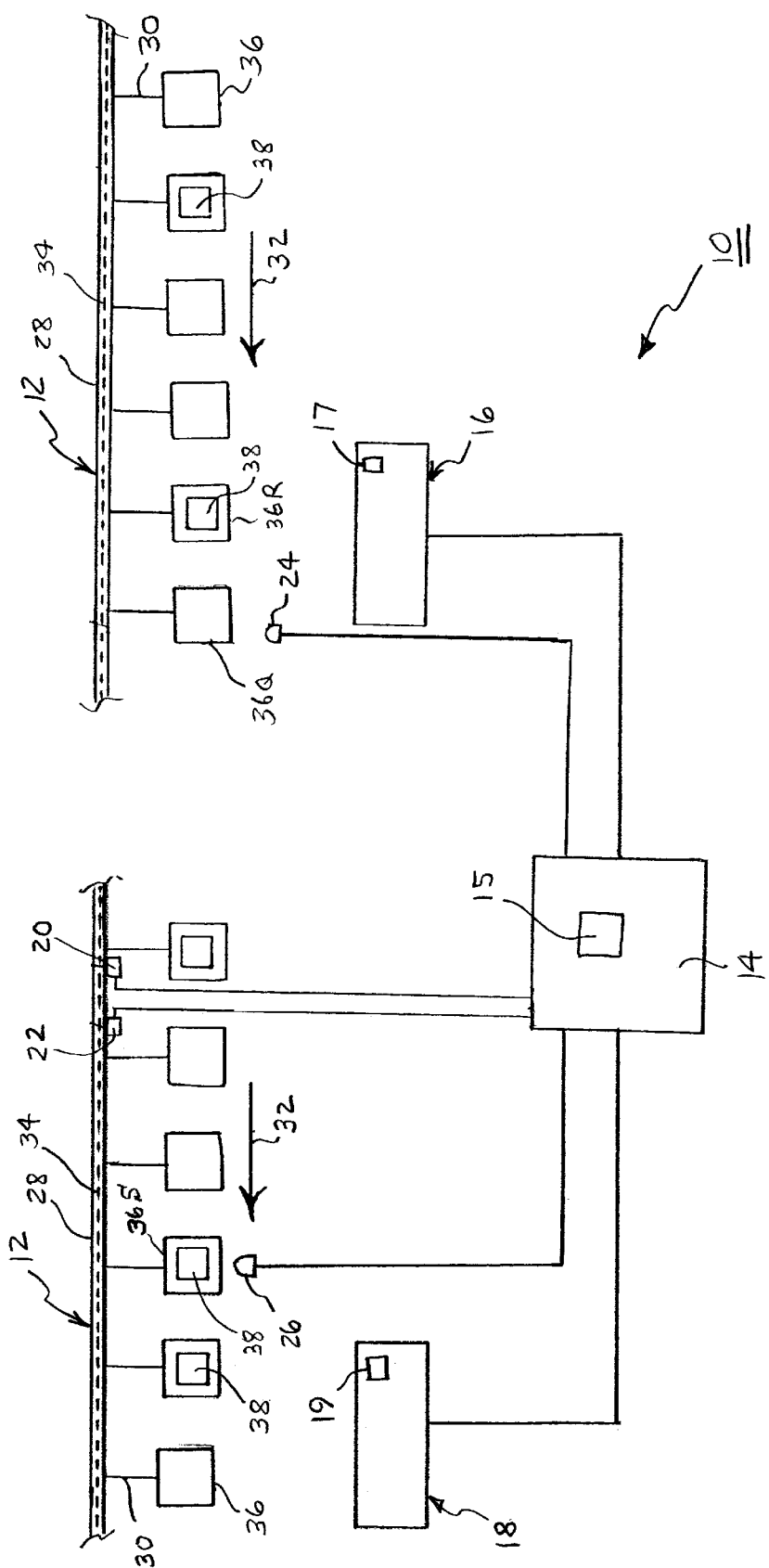
FIG. 1 is a conceptual diagram of a conveyor line process control system.

The embodiments described below are merely exemplary and are not intended to limit the invention to the precise forms disclosed. Instead, the embodiments were selected for description to enable one of ordinary skill in the art to practice the invention.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 shows a conveyor line process control system 10 interacting with a conveyor 12. System 10 includes a controller 14 having a memory 15, first and second stations 16, 18 coupled to controller 14, first and second conveyor sensors 20, 22 coupled to controller 14, and optional first and second load sensors 24, 26. Conveyor 12 includes a conveyor rail 28 to which conveyor load bars 30 are movably connected and carried, typically, in a forward direction as indicated by the pair of directional arrows 32. A chain 34 traverses conveyor 12 adjacent rail 28 and moves load bars 30. A plurality of hangars 36 are coupled to conveyor rail 28 by load bars 30. Parts, devices, components, etc. (generally referred to as units 38) are placed on empty hangars 36, and are processed by processing equipment (not shown) as hangars 36 move along conveyor rail 28. Stations 16,18 include indicators 17,19, respectively.

Conveyor sensors 20, 22 are spaced apart on conveyor rail 28. As further described below, controller 14 monitors output signals from sensors 20, 22 to determine whether hangars 36 on conveyor 12 are moving in forward direction 32, are stopped, or are moving in reverse. Sensors 20, 22 may be any of a variety of different types of sensors for detecting movement of conveyor 12 and/or hangars 36. For example, sensors 20, 22 may be coupled to chain 34 to mechanically, electrically, magnetically, optically, or otherwise detect movement of chain 34. Alternatively, sensors 20, 22 may employ any or a combination of the above-listed technologies for detecting movement of load bars 30 or hangars 36. These, and any of a number of other sensing schemes may be employed to detect the movement and direction of conveyor 12 and/or the components connected to conveyor 12.

Figure 2:
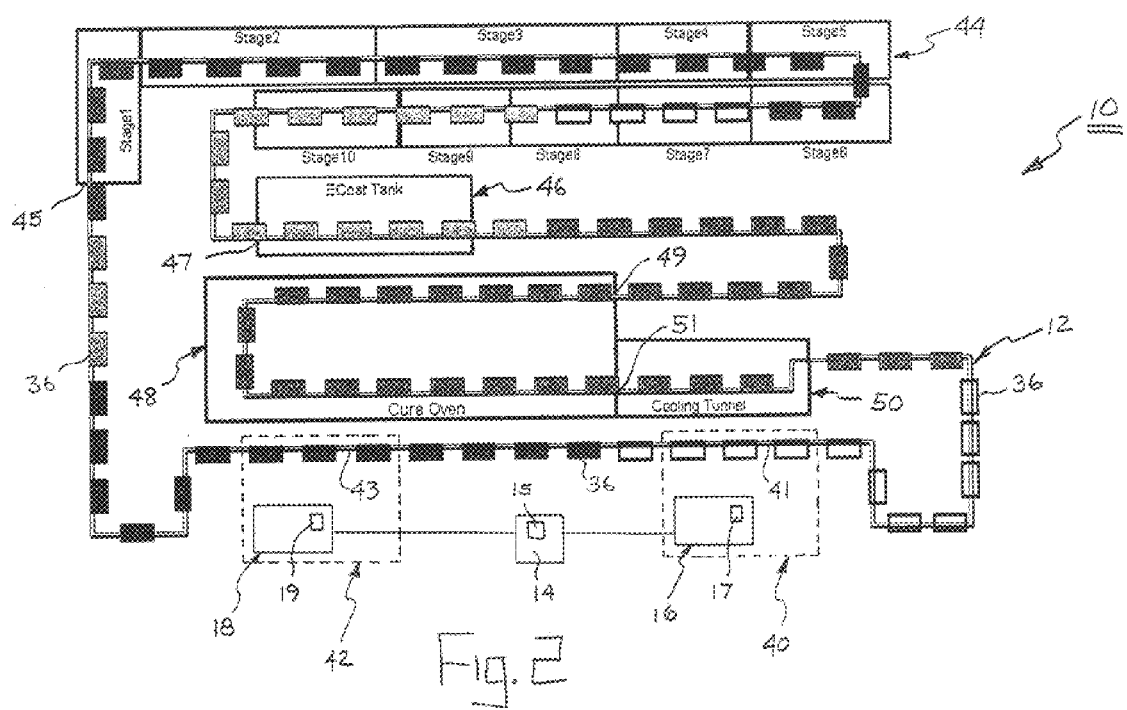
FIG. 2 is another, more detailed conceptual diagram of a conveyor line process control system.

Different units frequently require different types of processing. For example, a conveyor line can be configured to assemble various units processed through the line, or provide finish processing of units. Referring now to FIG. 2, conveyor 12 is routed through multiple processing areas as described below. Each processing area (not shown) of conveyor system 10 can be configured to accommodate different units having different finish requirements. Hangars 36 are schematically represented by shaded boxes dispersed along conveyor 12. In a first conveyor section 40 including first station 16, units 38 are placed on hangars 36 at location 41.

Likewise, in a second conveyor section 42 including second station 18, units 38 are placed on hangars 36 at location 43.

Processing areas are defined by processing equipment and, in the illustrated embodiment, include multi-stage preparation equipment 44, an Ecoat tank 46, a cure oven 48, and a cooling tunnel 50. Units 38 enter multi-stage preparation equipment 44 at location 45, Ecoat tank 46 at location 47, cure oven 48 at location 49, and cooling tunnel 50 at location 51. To provide different finishes, processing equipment in each processing area 44, 46, 48, 50 often requires adjustment before the unit is processed in that processing area. To associate units 38 with finish requirements, each unit 38 is assigned a unit type. The unit type may be input by an operator at each station 16, 18 via a keyboard-type device, a touch-sensitive display, a bar-code reader, or any of a variety of other suitable manual or automatic data entry methods. Each unit type has a corresponding set of process control variables to control the processing equipment. Accordingly, controller 14 selects the corresponding process control variables associated with the selected unit type.

The processing equipment of conveyor system 10 is configured according to the process control variables to accommodate different units having, for example, different finish requirements. Controller 14 monitors the progress of conveyor 12, mapping the position of each hangar 36 on conveyor 12 into a memory 15 or other suitable data storage device. Depending on the process variables selected and the processing equipment affected, controller 14 provides the process variables to the equipment and determines the proper time to load units 38 onto hangars 36 (and the proper conveyor section 40, 42) such that the units 38 reach the processing equipment at an appropriate time. For example, in the illustrated embodiment, stage 1 of multi-stage preparation equipment 44 is a pressure washer. Since no lead time is required to fully activate the pressure washer, controller 14 provides multi-stage preparation equipment 44 the necessary process control variables corresponding to a unit 38 just as unit 38 enters stage 1 via conveyor 12. Conversely, cure oven 48 requires a lead time to adjust to the appropriate temperature corresponding to the processing requirements associated with unit 38. Thus, if cure oven 48 is required to cool, for example, from a current temperature to a cooler temperature, controller 14 provides the process control variables corresponding to unit 38 at a time before unit 38 enters cure oven 48. As a result, cure oven 48 has enough lead time to cool to the required temperature and reach steady state conditions by the time unit 38 enters cure oven 48.

Controller 14 also determines the appropriate time for the operator (or automatic loading equipment) to load units 38 onto hangars 36. In the case of manual loading, indicator 17 at first station 16 is activated to notify the operator that a unit 38 is to be loaded onto a hangar 26 at conveyor section 40. Similarly, indicator 19 at second station 18 is activated to notify the operator that a unit 38 is to be loaded onto a hangar 36 at conveyor section 42. In one embodiment, indicators 17, 19 are lights which are activated to indicate when loading may commence. Of course, indicators 17, 19 can be realized by other means, such as an audible signal, a software screen, or an electromechanical device that prevents loading a hangar 36. Indicators 17, 19 are not needed if an automated loading system is incorporated into conveyor system 10. In such an embodiment, controller 14 is coupled to the automated loading system and activates the automated loading system at the appropriate time to load unit 38 onto hangar 36.

Figure 3:
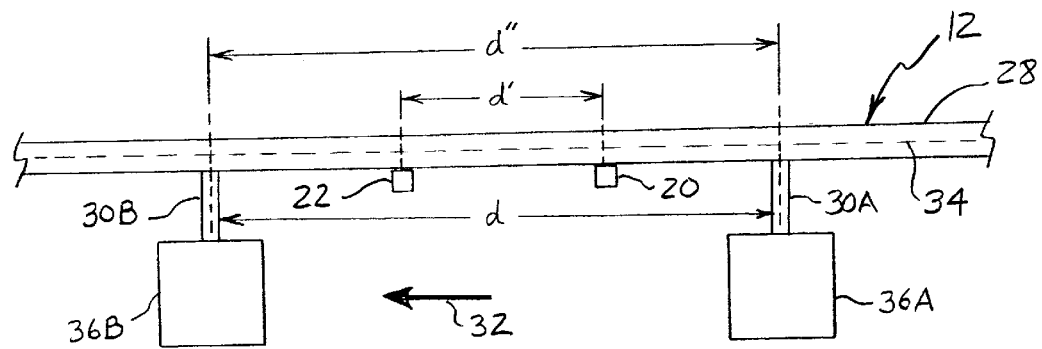
FIG. 3 is a schematic diagram of a portion of the system shown in FIG. 1.

Referring now to FIG. 3, first and second sensors 20, 22 may be coupled to, in proximity of, or otherwise operably associated with conveyor rail 28. As indicated above, controller 14 monitors the progress of conveyor 12 based on input from first and second sensors 20, 22. Progress of conveyor 12 is tracked by incrementing or decrementing the conveyor map stored in memory 15 of controller 14. In the illustrated embodiment, conveyor load bars 30A, 30B are spaced apart by a distance d, and first and second sensors 20, 22 are spaced apart by a distance d', which is less than distance d. Sequential activation of first and second sensors 20, 22 indicates that conveyor 12 is moving in forward direction 32. Conversely, activation of second sensor 22 followed by first sensor 20 indicates that conveyor 12 is moving in a reverse direction. Activation of first sensor 20 twice in succession (before activation of second sensor 22), or activation of second sensor 22 twice in succession (before activation of first sensor 20), indicates that conveyor 12 has changed direction. During normal operation, controller 14 tracks the forward progress of conveyor 12 by incrementing data in the conveyor map in memory 15 of controller 14 upon sequential activation of first and second sensors 20, 22. Likewise, controller 14 tracks the backward progress of conveyor 12 by decrementing the data in the conveyor map upon sequential activation of second and first sensors 22, 20.

Figure 4:
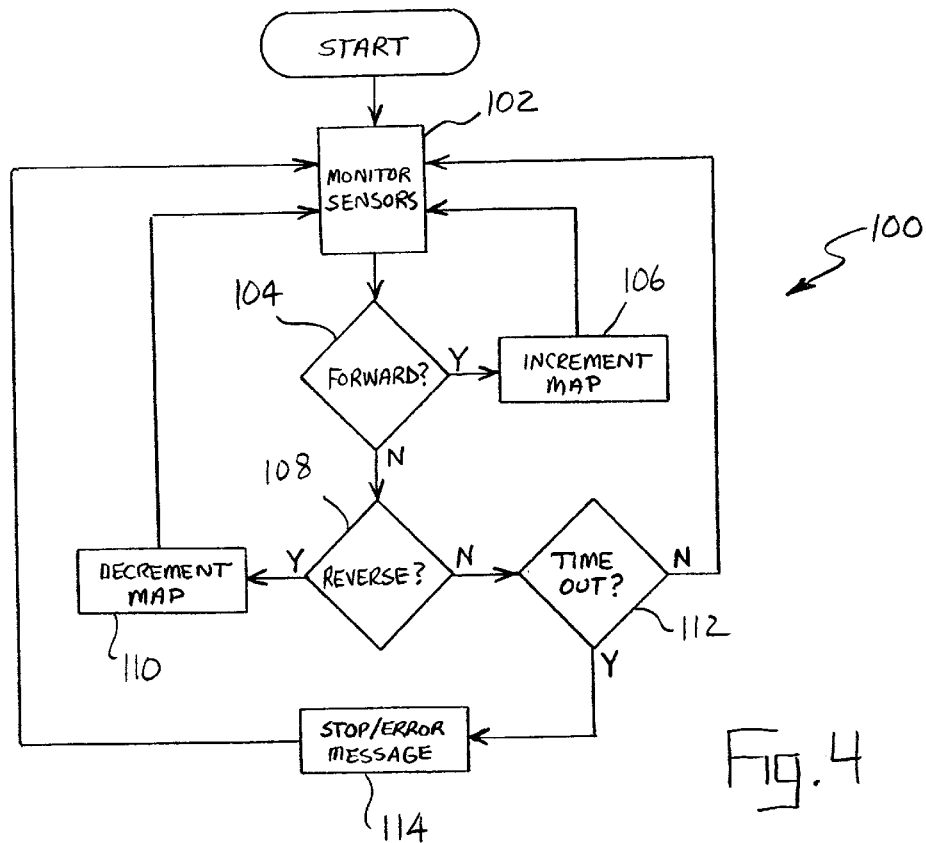
FIG. 4 is a flow diagram depicting a process for determining the progress of a conveyor based on inputs received from sensors.

In one embodiment, controller 14 increments the conveyor map through interaction with sensors 20, 22 according to a procedure represented by flow diagram 100 of FIG. 4. In step 102, controller 14 monitors inputs from first and second sensors 20, 22. When an input is received at controller 14, step 104 determines whether sensors 20, 22 indicate forward progress of conveyor 12. If forward progress is indicated, the conveyor map is incremented (at step 106) and step 102 is repeated. If forward progress is not indicated, step 108 determines whether reverse progress is indicated. If reverse progress is indicated, then the conveyor map is decremented at step 110, and step 102 is repeated.

If neither forward nor reverse progress is indicated, it is possible that conveyor 12 has stopped or an error has occurred. Accordingly, controller 14 determines whether a time out for receiving an input from sensors 20, 22 has occurred, as shown in step 112. If no time out has occurred, then step 102 is repeated. Conversely, if a time out has occurred, indicating that no input has been received from sensors 20, 22 during a specified time period, controller 14 issues a message that conveyor 12 has either stopped or an error has occurred, as shown in step 114.

In addition to monitoring the progress of conveyor 12, controller 14 also monitors the speed of conveyor 12 and the actual distance between hangars 36. Using the speed and distance calculations, controller 14 accurately measures the distance any particular hangar 36 is from each processing area 44, 46, 48, 50, and the corresponding time required for that particular hangar 36 to reach a particular processing area 44, 46, 48, 50. These measurements are used to calculate required lead times for processing equipment to reach a steady state condition. While hangars 36 are nominally spaced apart a distance d (FIG. 3), slack in conveyor chain 34, and thermal expansion or contraction may cause hangars 36 to vary from the nominal distance d to a variable distance d".

The speed v of conveyor 12 is calculated as follows:

$$v = d'/t$$

where
    d'=distance between sensors 20, 22; and
    t=time between sequential activation of sensors 20, 22 by a hangar 36.

Once the speed v is calculated, the variable distance d" can be calculated as follows:

$$d''=vt'$$

where
v=the speed of conveyor 12 (d'/t); and
t'=time between successive activation of a sensor 20, 22 by successive hangars 36.

Figure 5A:
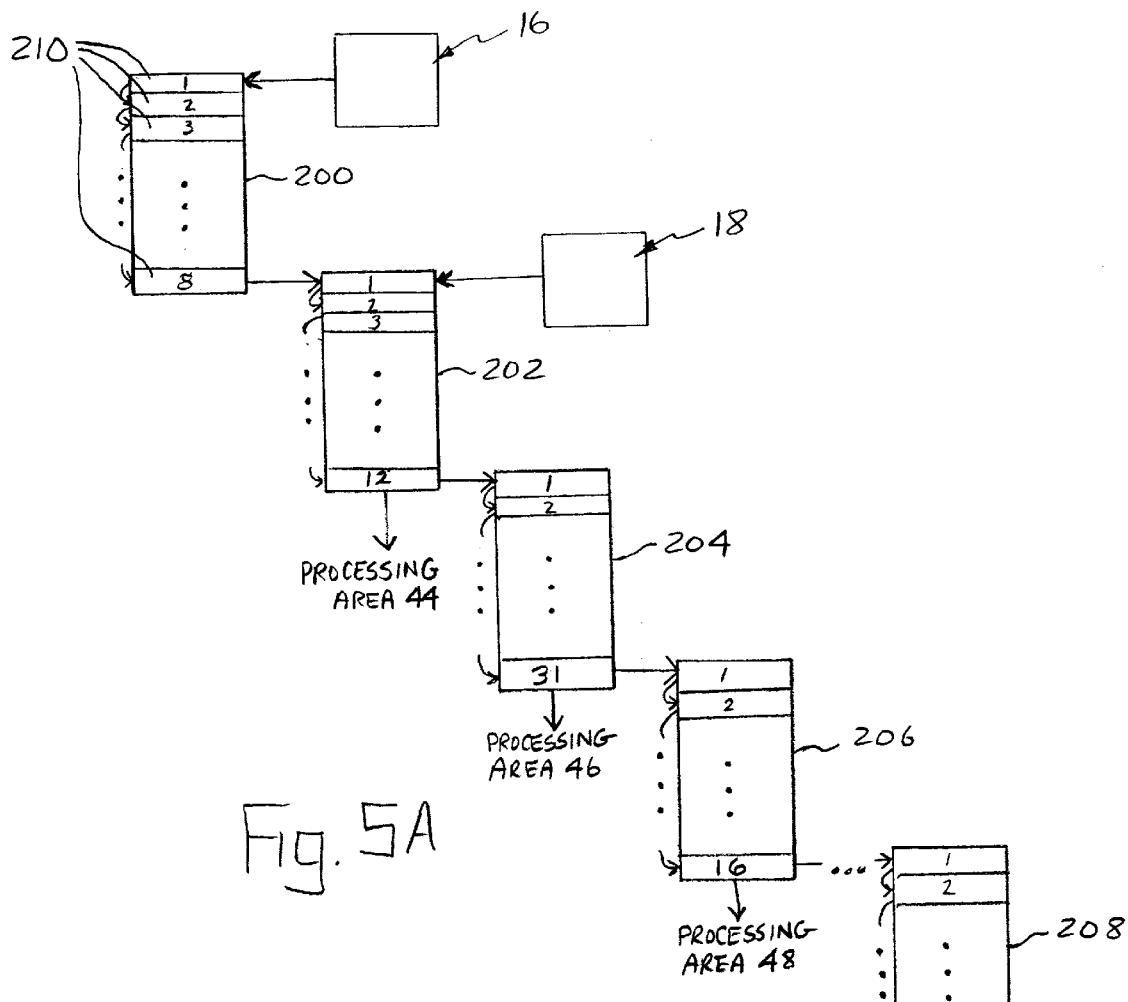
FIG. 5A is a conceptual diagram of an exemplary embodiment of a stack data structure.

Creating a map of the conveyor involves associating the process control variables and units 38 with the physical location of hangars 36. As the progress of conveyor 12 is monitored by controller 14, the appropriate process control variables are provided to the processing equipment for each unit 38. FIG. 5A is a block diagram of an exemplary embodiment of a data structure used to map conveyor 12 in memory 15 of controller 14. Illustratively, controller 14 employs Programmable Logic Controllers (PLC) utilizing a stack data structure. The stacks are based on a First-In-First-Out (FIFO) structure, each stack having a specific number of data records. In one embodiment, each stack corresponds to a length of conveyor 12 between specific locations on conveyor 12. The number of data records corresponds to the number of hangars 36 normally located between the specific locations on conveyor 12. For example, referring to FIG. 2, the number of hangars 36 between locations 41 and 43 is eight. Thus, first stack 200 has eight data records. Similarly, second stack 202 has twelve data records since the number of hangars 36 between locations 43 and 45 is twelve. Likewise, third stack 204 has 31 data records, fourth stack 206 has 16 data records, fifth stack 208 has 16 data records, and sixth stack (not shown) has 14 data records.

Figure 5B:
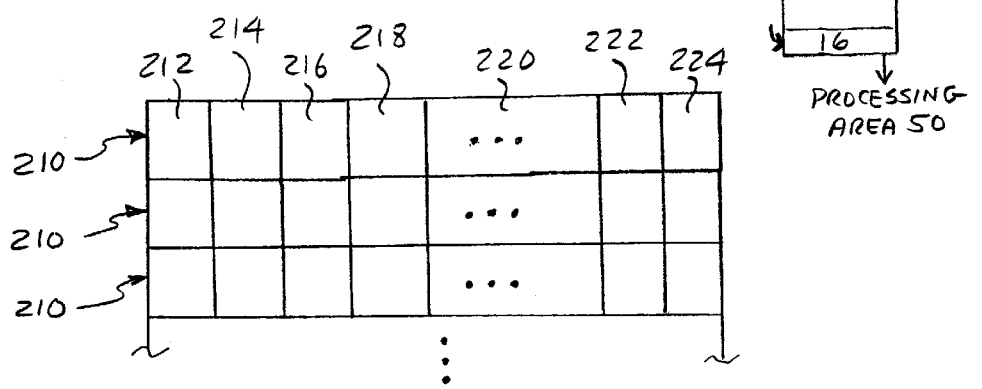
FIG. 5B is a conceptual diagram of fields in the data records stored in the data structure of FIG. 5A.

The data contained in each data record 210 of stacks 200–208 is described with reference to FIG. 5B. Each data record 210 includes a plurality of fields 212–224. Field 212 corresponds to a particular hangar 36 on conveyor 12. Field 214 is a data field containing values indicating whether the particular hangar 36 is loaded (i.e., is carrying a unit 38). Illustratively, a "1" indicates hangar 36 is loaded with a unit 38, and a "0" indicates hangar 36 is empty. Fields 216–224 are used to store process control variables associated with the unit 38 corresponding to the data record 210.

Each time controller 14 increments the progress of the conveyor map in memory 15 based on the input received from sensors 20, 22, first stack 200 is incremented and the process control variable data based on the unit type selected at first station 16 is written into data fields 216–224 of first data record 210, along with a variable value (e.g., "0" or "1") in field 214 indicating whether hangar 36 is loaded or empty. When stack 200 is full, data records 210 are sequentially loaded from the last data record of stack 200 to the first data record 210 of second stack 202.

Second stack 202 corresponds to second station 18. If a unit 38 is to be loaded onto a hangar 36 at second station 18, process control variable data based on the unit type selected at station 18 is written into data fields 216–224 of the data record 210 corresponding to the hangar 36, provided no unit is currently loaded in hangar 36 corresponding to that data record 210 (i.e., provided that data field 214 contains a "0" value). If a unit 38 was loaded onto hangar 36 at first station 16, then controller 14 may indicate through indicator 19 that the unit 38 cannot be loaded. Preventing second stack 202 from being loaded with process control variables when corresponding data field 214 indicates the corresponding hangar 36 is loaded (e.g., has a data value of "1") prevents process control variables from being overwritten, and also prevents erroneous mapping of multiple units 38 on one conveyor hangar 36.

Each time controller 14 increments the progress of conveyor 12 based on the input received from sensors 20, 22, all stacks 200–208 are incremented. When stack 202 is full, the data is pushed onto stack 204, and may also be provided to the multi-stage preparation equipment of processing area 44. The multi-stage preparation equipment adjusts its processing actions accordingly. For example, if Stage 1 is a pressure washer, and corresponding processing variables indicate that the pressure washer is to be activated, the pressure washer will activate if not currently activated.

As indicated above, other processing equipment, such as cure oven 48, will require lead time to reach steady state before unit 38 enters the processing equipment. Accordingly, when an operator selects a unit type, controller 14 loads the process control variables associated with that unit type onto its corresponding stack 200, 202. However, controller 14 may not indicate to the operator that unit 38 should immediately be loaded onto hangar 36; instead, controller 14 calculates the necessary time required for cure oven 48, for example, to reach steady state and may delay the loading of unit 38 to create a plurality of empty hangars 36 between the first hangar 36 with the new process control variables associated with unit 38 and the first hangar 36 upon which unit 38 is loaded.

FIGS. 6A–6C illustrate the above-mentioned lead-time procedure. In FIG. 6A, cure oven 48 is at a temperature as specified by process control variables associated with unit type 38A, one of which is shown moving into cure oven 48 on hangar 36A. At first station 16, an operator selects or inputs unit type 38B, which illustratively will require cure oven 48 to cool by 200 degrees, as required by the process control variables associated with unit 38B. The process control variables associated with unit 38B are loaded into a data record 210 (at fields 216–224) corresponding to hangar 36K. At this point, controller 14 determines whether any units 38 are in cure oven 48, and the unit type associated with any such units by accessing the process control variables stored in fields 216–224 of data records 210 associated with the hangars 36 currently located in cure oven 48 as indicated by the conveyor map of memory 15. If none of the hangars 36 in cure oven 48 are carrying units 38, then controller 14 may immediately communicate the process control variables associated with unit 38B to cure oven 48 (i.e., cause the set point of cure oven 48 to begin lowering). Controller 14 then calculates the time required for hangar 36K to reach cure oven 48 (based on the speed of conveyor 12) and the time required for cure oven 48 to reach steady state conditions at the new set point. If the time required for cure oven 48 to cool is less than the travel time for hangar 36K, then controller 14 may indicate to the operator that a unit 38B should be immediately loaded onto hangar 36K. If, on the other hand, cure oven 48 will not reach steady state conditions before hangar 36K reaches cure oven 48, then controller 14 will indicate to the operator that no units 38B should be loaded until an appropriate delay time has elapsed.

If, as is the case in this example, hangars 36 in cure oven 48 are not empty, but rather are carrying units 38 (specifically, units 38A), then controller 14 monitors the progress of units 38A through cure oven 48 (by accessing the conveyor map stored in memory 15) until hangar 36A exits cure oven 48 (assuming hangar 36A is the last hangar 36 carrying a unit 38A, and that hangars 36B–J (not shown) are empty). When hangar 36A exits cure oven 48, controller 14 may communicate the process control variables associated with unit 38B to cure oven 48 (i.e., cause the set point of cure oven 48 to begin lowering). Controller 14 then calculates the time required for hangar 36K to reach cure oven 48 and the time required for cure oven 48 to reach steady state conditions. As described above, controller 14 then indicates to the operator whether to load unit 38B onto hangar 36K. In this example, the travel time of hangar 36K is shorter than the cooling time of cure oven 48. Thus, controller 14 indicates that hangar 36K should not be loaded with unit 38B. Controller 14 continues to perform these calculations as additional hangars 36 pass through first station 16.

FIG. 6B indicates that when hangar 36K reaches cure oven 48, hangar 36X is located at first station 16. At this point, controller 14 determines whether hangar 36X should be loaded with unit 38B. In this example, cure oven 48 will require more time to reach steady state conditions than hangar 36X will take to reach cure oven 48. Thus, hangar 36X is not loaded. The same determination is made for hangar 36Y. Finally, when hangar 36Z reaches first loading station 16, controller 14 determines that cure oven 48 will reach steady state conditions before (or when) hangar 36Z reaches cure oven 48. Accordingly, controller 14 indicates to the operator to load unit 38B onto hangar 36Z.

As shown in FIG. 6C, hangars 36X, 36Y enter cure oven 48 empty. When hangar 36Z reaches cure oven 48 (carrying unit 38B), cure oven 48 has reached steady state conditions at the new, 200 degree cooler, set point. Of course, additional units 38B may have been loaded onto the hangars 36 (not shown) following hangar 36Z.

Figure 7A:
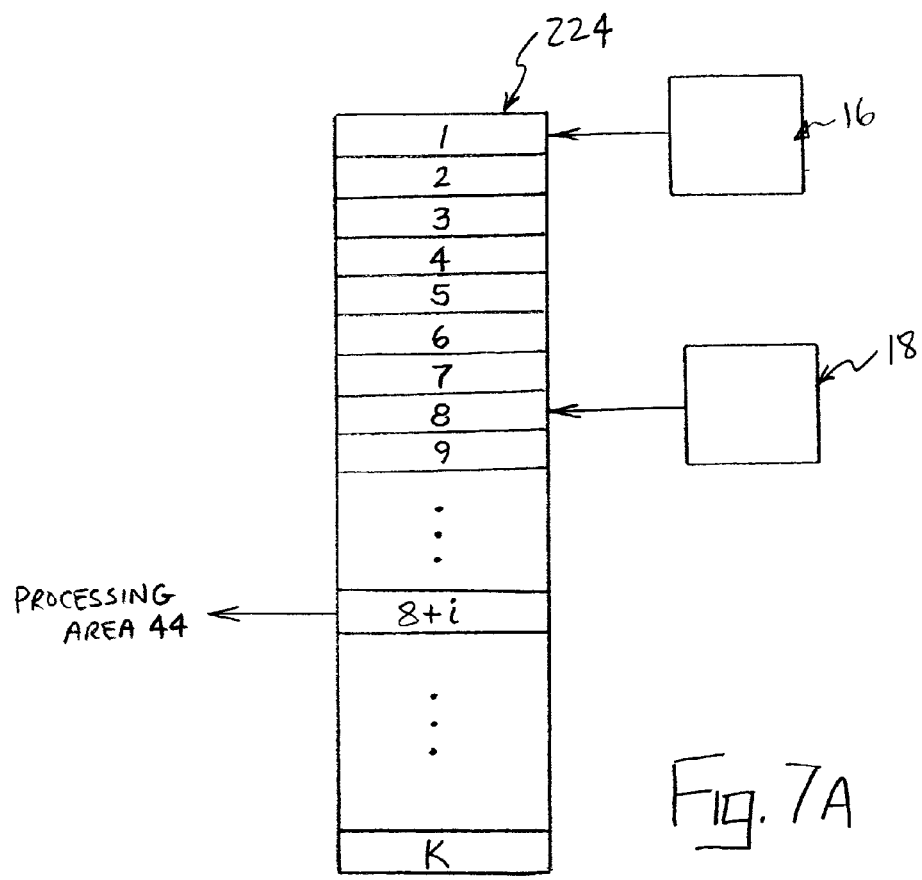
FIG. 7A is a conceptual diagram of another embodiment of a data structure including an array stack.

Other data structures and/or hardware may be used to map conveyor 12 and the corresponding process control variables. FIG. 7A is a conceptual diagram of another exemplary embodiment of a data structure including an array stack 224 corresponding to first and second stations 16, 18. The array stack 224 has records 1 through K, and is incremented each time controller 14 increments the progress of conveyor 12 based on the input received from first and second sensors 20, 22. In the illustrated embodiment, first station 16 and second station 18 are physically separated by eight hangars 36. Thus, process control variables corresponding to a unit type selected at first station 16 are loaded onto the top of stack 224 when a unit 38 is loaded, and process control variables corresponding to the unit type selected at second station 18 are inserted into stack 224 at record eight. Units 38 at second station 18 are loaded onto hangars 36 when record eight of array stack 224 is empty, indicating that the hangar 36 associated with record eight is empty. Processing area 44 receives process control variables associated with a particular unit type by indexing array stack 224 at index 8+i, since processing area 44 is "i" hangar locations distant from second station 18. In the embodiment shown in FIG. 2, i=12.

As described above with reference to FIGS. 6A–C, controller 14 may provide process control variables of a second unit type selected by an operator to processing area 44 as soon as processing area 44 is finished processing units 38 of a first unit type, if there are no intervening units 38 between the operator station 16, 18 and processing area 44. Controller 14 is configured to provide the process control variables to processing area 44 by an index reference into array stack 224.

Figure 7B:
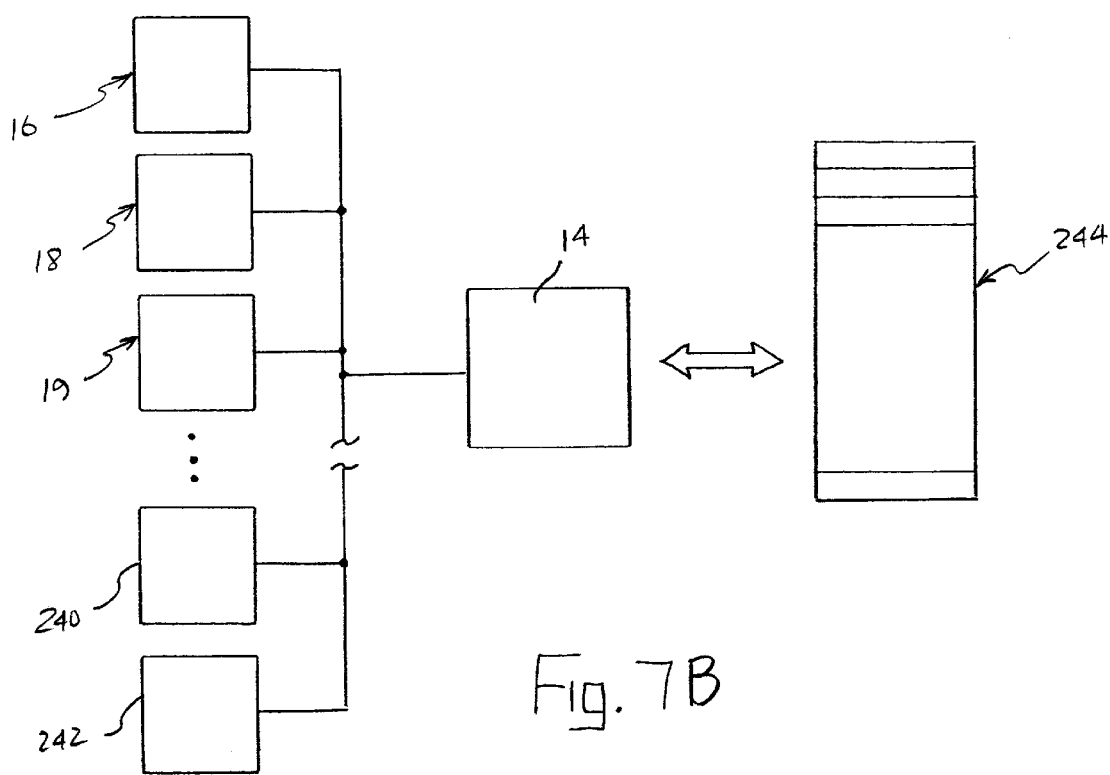
FIG. 7B is a block diagram of another embodiment of a conveyor line process control system configured to associate process variable data with units on a conveyor loaded from a plurality of stations.

Referring now to FIG. 7B, yet another embodiment includes associating process control variable data with units 38 on conveyor 12 loaded from a plurality of stations 16, 18, 19, and providing the process control variable data to associated processing equipment. Plurality of stations 16,17, 19 and associated processing areas 240, 242 are coupled to controller 14. Controller 14 stores the inputs (regarding unit types, etc.) received from stations 16, 18, 19 in memory 244 and provides the associated process control variables to processing equipment 240, 242 at the required times so that processing equipment 240, 242 can reach a steady-state conditions when units 38 associated with the process control variables reach processing equipment 240, 242.

For various reasons, human operators may not load units 38 in a timely manner (i.e., when the controller 14 indicates that the units 38 should be loaded). Use of an automated loading system ensures that units 38 are loaded onto hangars 36 when indicated by controller 14, and thus enables controller 14 to more accurately map units 38 and associated process control variables in the memory map corresponding to conveyor 12. Alternatively, system 10 of FIG. 1 may include first and second detectors 24, 26 which detect the presence (and absence) of units 38 loaded at first station 16 and second station 18, respectively. At the particular moment in time depicted in FIG. 1, hangar 36Q is adjacent first detector 24. Hangar 36Q also corresponds to first record 210 in first location stack 200 (FIG. 5A) and first process control variable stack 202. Loading at first station 16 occurs upstream of first detector 24 (i.e., hangar 36Q is loaded before it passes first detector 24) in order for first detector 24 to detect unit 38 after it is loaded onto hangar 36Q. Thus, as shown in FIG. 1, when controller 14 increments the stacks, a "0" value will be pushed onto the first location stack 200, since hangar 36Q is empty. As hangars 36 move down conveyor rail 28, controller 14 increments the stacks a second time, and a "1" will be pushed onto first location stack 200, since hangar 36R is loaded with unit 38.

Controller 14 determines from the input received from first detector 24 when empty hangars 36 are available at second station 18. Controller 14 monitors second detector 26 to determine onto which hangars 36 units 38 are loaded at second station 18.

Figure 8:
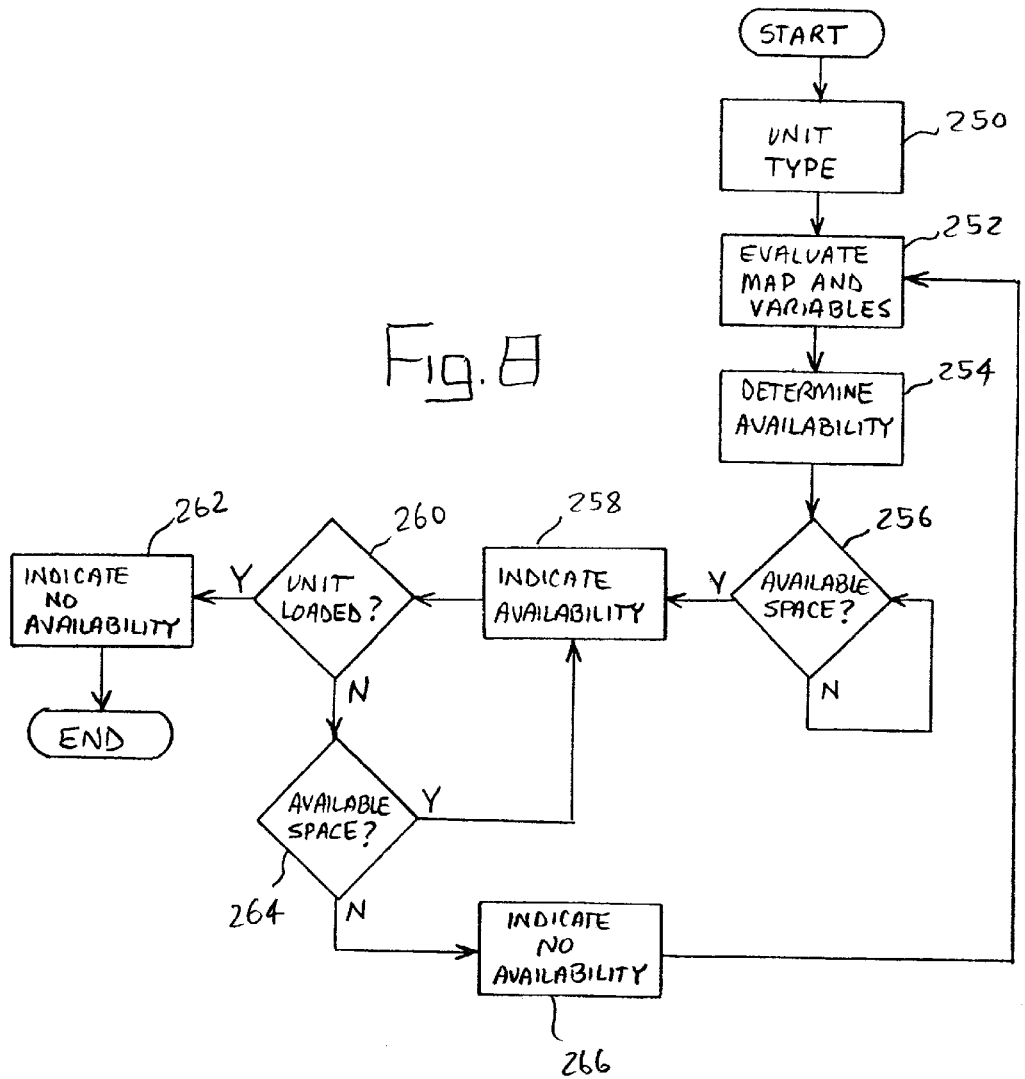
FIG. 8 is a flow diagram depicting a process for selecting process variables corresponding to a unit type and determining the load availability for the unit.

FIG. 8 is a flow diagram describing a process for selecting process control variables corresponding to unit types, determining the load availability for units 38, and tracking hangars 36 that receive units 38. For each station 16, 18, controller 14 receives the unit type of unit 38 to be loaded, as shown in step 250. In the illustrated embodiment, for second station 18, the controller 14 evaluates the current map availability and the pending process control variables for units 38 already loaded onto conveyor 12 and the unit 38 to be loaded, as depicted in step 252. In step 254, controller 14 determines the available map spaces for unit 38 to be loaded. An available map space corresponds to a hangar 36 that is empty and at a distance from the processing equipment that will permit the processing equipment to reach steady state conditions by the time the hangar 36 (and loaded unit 38) reaches the processing equipment. Since second station 18 receives hangars 36 loaded at first station 16, it is likely that fewer hangars 36 will be available at second station 18.

Once the available map spaces are determined, controller 14 monitors whether the available map spaces are present at the respective station 16, 18, as shown in step 256. Once a map space is available at a station 16, 18, step 258 indicates that unit 38 may be loaded by activating the appropriate indicator 17, 19. Step 260 determines whether unit 38 has been loaded by monitoring the appropriate detector 24, 26. If unit 38 is loaded onto an available hangar 36, step 262 shuts off indicator 17, 19, and process control variable data corresponding to the unit type is loaded into the conveyor map of memory 15.

If unit 38 is not loaded onto an available hangar 36 and no more hangars 36 are immediately available as determined by step 264, step 266 deactivates indicator 17, 19 and the system returns to step 252 to re-evaluate the conveyor map to determine available map spaces.

The flow diagram of FIG. 8 is also applicable to batch processing for loading and processing a batch of units 38. Rather than determining whether a unit 38 is loaded, however, controller 14 indicates that units 38 from a batch may be loaded. Thus, the batch of units 38 is loaded as long as map space is available for units 38 from the batch to be processed.

By accurately mapping units 38 populating hangars 36 on conveyor 12, controller 14 ensures that the processing equipment is used in an efficient manner. For example, if no units 38 are in multi-stage processing area 44, controller 14 shuts off the equipment in processing area 44 to conserve power and reduce production of waste products.

Furthermore, controller 14 is configured to determine the optimum batch processing sequence. For each batch, an operator inputs into to controller 14 the number of units 38 and the unit type. Controller 14 evaluates the process variables associated with each batch, and determines the optimum batch processing sequence. For example, an operator may input three unit types associated with three batches A, B and C. In this example, batches A, B and C require cure oven temperatures of 200 degrees, 350 degrees and 500 degrees, respectively. Controller 14 determines the current temperature of cure oven 48 to determine the optimum batch processing sequence. Illustratively, if cure oven 48 is currently at 200 degrees, controller 14 determines that the optimum batch processing sequence is A, B, and then C.

Figure 9:
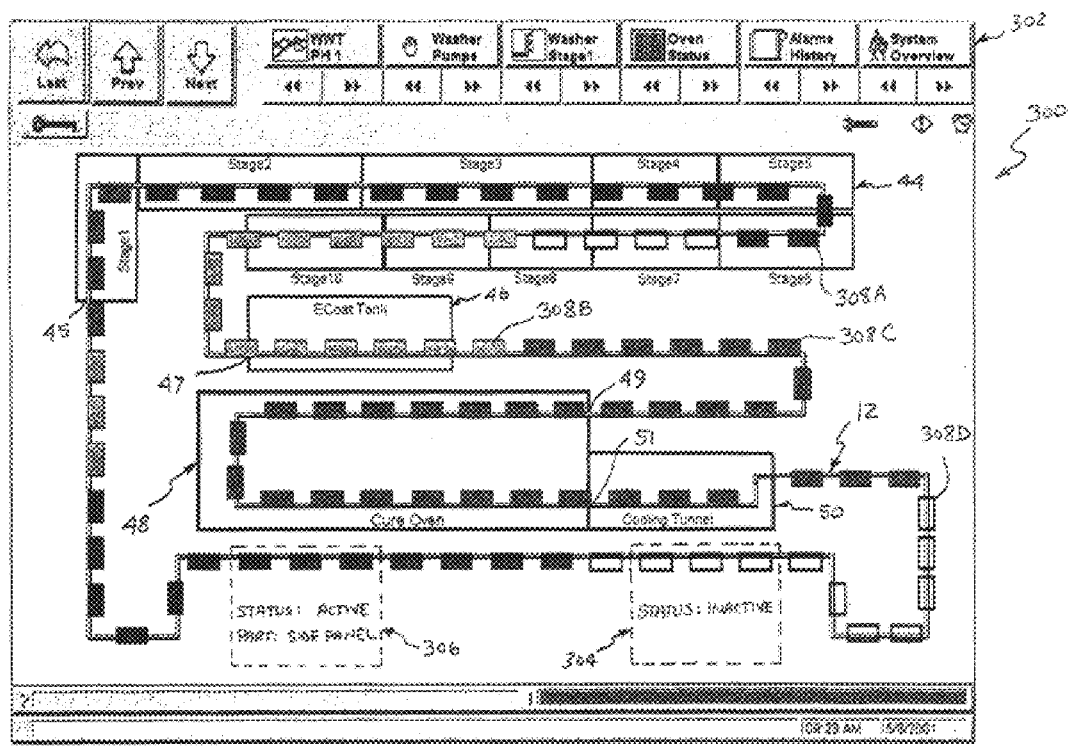
FIG. 9 is a display screen associated with the conveyor line process control system.

FIG. 9 is a software display screen associated with conveyor line process control system 10. In the illustrated embodiment, software display screen 300 includes a menu bar 302 having a plurality of user controls. Status messages regarding first station 16 and second station 18 are provided in status areas 304 and 306, respectively. As shown in FIG. 9, different unit types corresponding to units 38 populating hangars 36 are represented by icons 308A–D having different indicia, such as different colors, shading, or other marking. In this example, icons 308A correspond to hangars 36 populated by a first unit type, icons 308B correspond to hangars 36 populated by a second unit type, icons 308C correspond to hangars 36 populated by a third unit type, and icons 308D correspond to empty hangars 36. Clicking on a hangar icon 308A–D provides information regarding the unit type, whether the hangar 36 is populated, and the associated process control variables.

FIG. 10 is another embodiment of the conveyor line process control system 10 configured to associate process variable data with units 38 (not shown) on a conveyor 12 loaded from a plurality of stations 316A–316Z, and provide the process control variable data to associated processing equipment 318A–318Z based on the position of units 38 (not shown) on conveyor 12. Controller 14 determines the appropriate load times for units 38 at each of the plurality of stations 316A–Z. Controller 14 also monitors the progress of conveyor 12 via sensors 20, 22 (not shown) as previously described herein. Controller 14 associates in memory 15 the process control variables corresponding to a plurality of units 38 loaded at plurality of stations 316A–Z. By monitoring the progress of conveyor 12, controller 14 associates the process control variables and units 38 with physical locations on the path defined by conveyor 12. Depending on the location of a unit 38, the process control variables associated with the unit 38 are provided to the corresponding processing equipment 318A–Z.

The conveyor line process control system 10 may be implemented in processing systems utilizing, for example, monorail conveyors, electrified monorail conveyors, roller conveyors, slide bed conveyors, tow line conveyors, walking beam conveyors, and power-and-free conveyors. In a power-and-free conveyor system, a hangar 36 can be selectively powered to traverse the conveyor path, or can be freed to remain idle while other hangars 36 traverse the conveyor path. The conveyor line process control system 10 uses a dynamic array structure to track the progress of a power-and-free conveyor system. More specifically, controller 14 determines when to activate or power a hangar 36 based on the present location of hangar 36, the speed of conveyor 12, and the time required for the appropriate processing equipment to reach steady state conditions. If a particular hangar 36 is powered, the corresponding process control variable data record is inserted into the array at a location corresponding to the location of hangar 36 on conveyor 12. Conversely, if the particular hangar 36 is freed and idle, the corresponding process control variable data record is removed from the array and stored for insertion when the corresponding hangar 36 is again powered.

The conveyor line process control system 10 also determines preventative maintenance schedules for conveyor 12 and associated hardware, and for processing equipment of processing areas 44, 46, 48, 50. Using sensors 20, 22, controller 14 monitors the duration of use of conveyor 12 and processing areas 44, 46, 48, 50. Using OEM data, such as recommended maintenance schedules and mean-time-between-failure (MTBF) analyses, controller 14 determines when system maintenance is required.

The foregoing description of the invention is illustrative only, and is not intended to limit the scope of the invention to the precise terms set forth. Although the invention has been described in detail with reference to certain illustrative embodiment, variations and modifications exist within the scope and spirit of the invention as described and defined in the following claims.

What is claimed is:

1. A system for controlling a conveyor line having a conveyor for moving a plurality of hangars configured to carry units through processing areas for processing by equipment in the processing areas, the system including:

a first loading station for entering process control variables corresponding to units, the first loading station being located at a first location along the conveyor;

a second loading station for entering process control variables corresponding to units, the second loading station being located at a second location along the conveyor;

a pair of conveyor sensors operably associated with the conveyor, each sensor for sensing movement of the hangars and outputting a signal indicating the passage of a hangar; and a controller connected to the first and second loading stations and the conveyor sensors, the controller activating the processing equipment according to the process control variables, determining, based on the process control variables, the time required for the processing equipment to reach a steady state condition, and determining, based upon the signals from the conveyor sensors, the appropriate time for loading units onto hangars at the first and the second loading stations such that the units reach the processing equipment when the equipment has reached the steady state condition.

2. The system of claim 1 further including a first load sensor located adjacent the first loading station and a second load sensor located adjacent the second loading station, the first load sensor providing signals indicating one of the presence and absence of units loaded at the first loading station, the second load sensor providing signals indicating one of the presence and absence of units loaded at the second loading station.

3. The system of claim 1 wherein the controller determines, based on the signals from the conveyor sensors, a direction of movement of the conveyor.

4. The system of claim 1 wherein the first and second loading stations automatically enter the process control variables when the units are loaded onto hangars.

5. The system of claim 1 wherein the controller is adapted to communicate with automatic loading equipment located at the first and the second loading stations, the controller activating the automatic loading equipment at the appropriate time for loading units at the first and the second loading stations.

6. The system of claim 1 wherein the controller determines the appropriate time for loading a batch of units onto a plurality of hangars.

7. The system of claim 1 wherein the controller determines an order for loading a plurality of batches of units, each batch including units having a unit type that is different from unit types associated with units of the other batches of the plurality of batches.

8. The system of claim 1 wherein the system includes a plurality of loading stations connected to the controller.

9. The system of claim 1 wherein the conveyor is a power-and-free conveyor.

10. The system of claim 1 wherein the controller monitors the duration of use of the conveyor and the processing equipment to determine when system maintenance is required.

11. The system of claim 1 wherein the controller determines, based on the signals from the conveyor sensors, the speed of the conveyor.

12. The system of claim 11 wherein the controller determines the speed of the conveyor by measuring a first time between receipt of a signal from one of the pair of conveyor sensors and receipt of a signal from the other of the pair of conveyor sensors, and multiplying the first time by the distance between the sensors.

13. The system of claim 12 wherein the controller determines an actual distance between adjacent hangars by measuring a second time between receipt of successive signals from one of the pair of conveyor sensors, and multiplying the second time by the speed of the conveyor.

14. The system of claim 1 further including a first indicator located at the first loading station, the controller activating the first indicator at the appropriate time for loading a unit at the first loading station.

15. The system of claim 14 further including a second indicator located at the second loading station, the controller activating the second indicator at the appropriate time for loading a unit at the second loading station.

16. The system of claim 1 wherein the pair of conveyor sensors detect hangars as the hangars pass by the sensors, the controller incrementing a location of a hangar each time a hangar passes one of the sensors and then passes the other sensor.

17. The system of claim 16 wherein the controller decrements the location of the hangar each time a hangar passes the other sensor and then passes the one sensor.

18. The system of claim 1 further including a display, the controller generating an image representing the conveyor on the display.

19. The system of claim 18 wherein the display includes icons representing hangars, the controller responding to selection of an icon by generating a message on the display including information regarding a unit type and process control variables associated with a unit loaded onto the hanger represented by the selected icon.

20. The system of claim 1 wherein the process control variables associated with units loaded at the first loading station are stored in data records of a first stack.

21. The system of claim 20 wherein the controller stores data in a data record of the first stack to indicate that a hangar associated with the data record was not loaded at the first loading station.

22. The system of claim 21 wherein the process control variables associated with units loaded at the second loading station are stored in data records having data indicating that hangars associated with the data records were not loaded with units at the first loading station.

23. The system of claim 1 further including a memory connected to the controller, the memory including a map of locations of the hangars.

24. The system of claim 23 wherein the controller updates the map based on the signals received from the pair of conveyor sensors.

25. The system of claim 23 wherein the memory includes a FIFO stack structure having a plurality of stacks.

26. The system of claim 25 wherein each stack corresponds to a length of the conveyor and includes a plurality of data records.

27. The system of claim 26 wherein each time a unit is loaded onto a hangar at the first loading station, the controller stores process control variables corresponding to a unit type associated with the unit in a first data record of a first stack of the stack structure.

28. The system of claim 27 wherein each time a unit is loaded onto a hangar at the second loading station, the controller stores process control variables corresponding to a unit type associated with the unit in a first data record of a second stack of the stack structure.

29. The system of claim 28 wherein after each of the data records of the first stack have been associated with a hangar, any data stored in a last data record of the first stack is moved to the first data record of the second stack.

30. The system of claim 29 wherein the controller determines, based on the signals from the conveyor sensors, movement of the conveyor a first distance corresponding to a distance between adjacent hangars, the controller moving any data stored in the last data record of the first stack to the first data record of the second stack each time the controller determines that the conveyor has moved the first distance.

31. The system of claim 29 wherein any process control variables of the last data record are provided to processing equipment associated with the first stack when the data of the last data record is moved to the first data record of the second stack.

32. The system of claim 26 wherein each data record corresponds to a hangar.

33. The system of claim 32 wherein each data record includes a plurality of fields for storing data representing whether the hangar is loaded with a unit and process control variables corresponding to a unit type associated with the unit.

34. The system of claim 33 wherein the controller determines, based on the signals from the pair of conveyor sensors, movement of a hangar from a first position to a second adjacent position along a length of the conveyor, the distance between the first position and the second position corresponding to a distance between adjacent hangars.

35. The system of claim 34 wherein the processor responds to determining that the hangar has moved the second position by moving the processes control variables stored in each data record to an adjacent data record.

36. A system for controlling a conveyor line having a conveyor for moving a plurality of hangars configured to carry units through processing areas for processing by equipment in the processing areas, the system including:

first means located at a first location along the conveyor for entering process control variables corresponding to units;

second means located at a second location along the conveyor for entering process control variables corresponding to units;

means operably associated with the conveyor for sensing movement of the hangars and outputting a signal indicating the passage of a hangar; and means connected to the first and second means and the sensing means for controlling the processing equipment and the loading of units onto hangars, the controlling means activating the processing equipment according to the process control variables, determining, based on the process control variables, the time required for the processing equipment to reach a steady state condition, and determining, based upon the signals from the sensing means, the appropriate time for loading units onto hangars at the first and the second locations such that the units reach the processing equipment when the equipment has reached the steady state condition.

37. The system of claim 36 further including means for sensing one of the presence and absence of units loaded onto the conveyor.

38. The system of claim 36 further including means for indicating when to load units onto hangars.

39. The system of claim 36 further including means for storing data relating to the process control variables and locations of hangars.

40. The system of claim 39 further including means of displaying the data.

* * * * *